United States Patent [19]
Lloyd et al.

[11] Patent Number: 5,508,826
[45] Date of Patent: Apr. 16, 1996

[54] METHOD AND APPARATUS FOR CALIBRATED DIGITAL PRINTING USING A FOUR BY FOUR TRANSFORMATION MATRIX

[76] Inventors: William J. Lloyd, Court 5 #203 5-27-20 Koenji-Minami, Suginami-ku, Tokyo 166, Japan; John D. Meyer, 29360 Bird Rd., Tracy, Calif. 95376; King-Wah W. Yeung, 10129 Mello Pl., Cupertino, Calif. 95014

[21] Appl. No.: 53,638

[22] Filed: Apr. 27, 1993

[51] Int. Cl.$^6$ ............................... H04N 1/50; H04N 1/56; H04N 1/60
[52] U.S. Cl. .......................... 358/501; 358/504; 358/518; 358/519; 358/523
[58] Field of Search ..................................... 358/504, 406, 358/501, 401, 523, 518, 519, 296; 356/402, 405; 250/226; 395/109

[56] References Cited

U.S. PATENT DOCUMENTS

| | | | |
|---|---|---|---|
| 4,477,833 | 10/1984 | Clark et al. | |
| 4,670,780 | 6/1987 | McManus et al. | 358/518 |
| 4,680,645 | 6/1987 | Dispoto et al. | |
| 4,727,425 | 2/1988 | Mayne et al. | 358/523 |
| 4,736,245 | 4/1988 | Seto et al. | 358/504 |
| 4,751,535 | 6/1988 | Myers | |
| 4,752,822 | 6/1988 | Kawamura | 358/523 |
| 4,805,013 | 2/1989 | Dei et al. | 358/523 |
| 4,839,722 | 6/1989 | Barry et al. | 358/523 |
| 4,845,551 | 7/1989 | Matsumoto | 358/504 |
| 4,901,258 | 2/1990 | Akiyama | |
| 4,929,978 | 5/1990 | Kanamori et al. | |
| 4,930,018 | 5/1990 | Chan et al. | |
| 4,965,663 | 10/1990 | Sasaki | 358/504 |
| 5,015,098 | 5/1991 | Berg et al. | 356/402 |
| 5,068,810 | 11/1991 | Ott | |
| 5,107,332 | 4/1992 | Chan | 358/518 |
| 5,137,363 | 8/1992 | McCarthy | 356/402 |
| 5,271,096 | 12/1993 | Cook | 395/109 |
| 5,272,518 | 12/1993 | Vincent | 356/405 |

FOREIGN PATENT DOCUMENTS

| | | | |
|---|---|---|---|
| 0011377A1 | 5/1980 | European Pat. Off. | G01N 21/55 |
| 0383209B1 | 8/1990 | European Pat. Off. | G01J 3/46 |
| 0398502A3 | 11/1990 | European Pat. Off. | H04N 1/46 |
| 0454479A2 | 10/1991 | European Pat. Off. | H04N 1/46 |
| 0491131A1 | 6/1992 | European Pat. Off. | G01J 3/51 |

OTHER PUBLICATIONS

"Low-Cost Color Hardcopy Now Possible", Machine Design, May 24, 1990, pp. 62–63.

Clapper, F. R., "An Empirical Determination of Halftone Color-Reproduction Requirements", Technical Association of the Graphic Arts, Thirteenth Annual Meeting, Jun. 12–14, 1961, pp. 31–41.

*Primary Examiner*—Scott A. Rogers

[57] ABSTRACT

A Self Calibrating Color Printer. The present invention enables color printers to accurately reproduce color images despite variations in ink, paper or the printing system. The calibrated printer includes a movable optical sensor assembly which first calibrates itself by measuring an included known color gamut located within the movement range of the sensor assembly. Once calibrated, the sensor assembly measures a color print test pattern newly printed by a movable color print head of the printer. An analog-to-digital converter transforms electrical signals from the sensor assembly to sensor values in digital form, enabling a printer control processor to process the measured data, thereby producing two look-up tables stored in memory: first, a color correction look-up table which adjusts image color values to account for the ink/paper variations, and second, an error diffusion look-up table which spreads color value errors at a given pixel to its neighbors. Once the printer control processor creates these two look-up tables and, the printer is able to process image data, and control the print head via its associated print head electronics to faithfully reproduce the image onto paper. The moveable sensor and associated gamut and print test pattern of the present invention provide an accurate, inexpensive and durable apparatus for calibrating any digital color printer. The Self Calibrating Color Printer disclosed and claimed in this patent applications provides an advanced, accurate and relatively inexpensive instrument for true reproduction of detailed color images.

13 Claims, 5 Drawing Sheets

METHOD AND APPARATUS FOR CALIBRATED DIGITAL PRINTING USING A FOUR BY FOUR TRANSFORMATION MATRIX

BACKGROUND OF THE INVENTION

The present invention relates to digital printing, and more particularly to field calibration of digital color printers. A large share of personal computers now sold include high resolution color displays for viewing color images. Using thermal inkjet technology, personal color printers are capable of approximating the color images viewed on such displays. By precisely controlling ink dot size and ink dot color placement, color halftone images may be printed. However, variability in inks, papers and drop volume cause problems in exactly reproducing desired shades and color tones. Similar problems occur in other printing schemes which use pigmented inks or pigmented dry toners, such as color laser printers. These variations in pixel color, density and dot size result in poor reproduction and color distortions.

Aside from ink and paper variations, the very nature of digital printing creates other problems. Because only a limited number of discrete dot sizes of a given color ink are used, some technique for tonal averaging or smoothing is required to yield proper tones for those "in between" colors not ordinarily printable. A system using such averaging techniques trades spatial resolution for tonal veracity. These techniques are generally called digital half toning methods. Following the algorithm of any of these methods, dots are distributed upon the paper in patterns or populations so as to create the visual impression of an intensity between that of white paper and full ink coverage. One such technique for smoothing color variations is the error diffusion method, where the difference between a desired color density at a pixel and its actual printed density, the error, is distributed to adjacent pixels. Floyd, R. W., and Steinberg, L., "An Adaptive Algorithm for Spatial Gray Scale, Pro. SAID, Vol. 17/2 (Second Quarter 1976), pp. 75–77. The distributed error is incorporated in calculating the neighboring pixel's printed dot size and then a similar process of diffusing any error in the next computation is undergone. However, to correctly implement error diffusion, one requires precise knowledge of available pixel densities. Other methods make use of groups of dots, for example Clustered Dot Dither or Superpixel algorithms. Here the pattern of dot that most closely approximates the desired print density is chosen and no error processing occurs. For all these methods and approaches for approximating colors on paper, the applied color densities are influenced by the choice of ink and paper and vary with the tolerances and stability of the printing method.

Until now, one has designed personal color printers with some available set of dot sizes, calibrated the printer at a factory, and then relied upon the factory calibration despite changing ink/paper combinations used during the printer's life. A factory calibration process typically involves measuring print samples on a selected paper stock using relatively expensive laboratory equipment such as optical densitometers, colorimeters, and the like. Despite these centralized factory calibration procedures, there is no guarantee that a faithful reproduction will result when one uses somewhat different paper stock or a new batch of ink. Though it is conceivable that the printer could be recalibrated at the factory using a standard densitometer, it is not practical for users of personal color printers to return their printers to the factory for recalibration whenever paper stock or ink are changed. Similarly, though it is conceivable that the printer could be recalibrated in the field using the standard densitometer, standard densitometers are relatively expensive and require frequent maintenance, typical of laboratory equipment. It is therefore impractical to send such standard densitometers to users of personal color printers to recalibrate the printers in the field whenever paper stock or ink are changed.

FIG. 1 is a partial block diagram illustrating components and operation of a typical standard densitometer 100 used as a standard in measuring color density of an object sample under test. As discussed herein, the typical densitometer includes components that are constructed to conform to rigid uniform standards developed by such organizations as the American National Standard Institute (ANSI) and the International Standards Organization (ISO). Such construction greatly adds to the size, weight, maintenance, and cost of densitometer components and to overall size, weight, maintenance, and cost of the densitometer. For example, the typical densitometer includes a relatively expensive light source 104, which requires frequent replacement. In conformance with densitometer component standards, the light source is constructed to maintain long term stability of a particular spectral energy distribution. For example, the standards have previously been described in terms of a tungsten filament lamp providing an influx from the lamp operating at a Plankian spectral energy distribution of 3000 degrees Kelvin. An illustrative standard for the densitometer light source illuminant is known in the industry as 2856K ANSI. Because of the high temperature of operation, the 3000 degree tungsten filament lamp has a reduced Mean Time Between Failure (MTBF) and must be frequently replaced as part of a laboratory equipment maintenance schedule. While such maintenance requirements can be tolerated in equipment used in centralized facilities such as laboratories and factories, they would be quite inconvenient in equipment used by consumers for field calibration of color printers.

As shown in FIG. 1, the light source projects light through a precision ground glass lens 106 mounted in collimator housing 102, which serves to focus light from the light source into a narrow collimated beam of light rays 110. The light rays transmitted through the lens project through a precision machined aperture 108 in the collimator housing. Dimensions of the aperture determine the size of an irradiated area of the object sample under test. Various standards have been defined for preferable sizes of the irradiated area.

As the light rays are projected onto the object sample 112, electromagnetic radiation shown as light rays 114 will be reflected from the object sample under test 112. For purposes of detecting the reflected light rays 114, a rotatable spectral filter apparatus 116 is provided. The filter apparatus 116 can include a plurality of densitometer filters 118, 119, 120, and 122 which are employed for purposes of analyzing spectral response of the object sample under test. FIG. 1 shows a red densitometer filter 118, a neutral densitometer filter 119, a green densitometer filter 120 and a blue densitometer filter 122. The densitometer filters are relatively expensive, in part because they are constructed to have spectral transmittance characteristics in conformance to a particular densitometer filter standard. For example, an illustrative densitometer filter standard is known in the industry as the ANSI Status T Color response.

The spectral filter apparatus 116 shown in FIG. 1 includes not only the filters 118, 119, 120 and 122, but is also shown as including a shaft 124 having one end connected to a rotatable "wheel" 126 on which the spectral filters are positioned and spaced apart. The other end of the shaft 124 is connected to a manually rotatable knob 128. In the actual mechanical configuration of the densitometer 100, the knob 128 would be made accessible to the user for purposes of manual rotation of the wheel 126 so as to selectively position the individual filters as desired. In FIG. 1, the red filter 118 is shown as being appropriately positioned for transmitting a portion of the reflected light rays 114 therethrough.

Each of the filters can be individually selected by rotating the wheel to align the desired filter with a densitometer photo-electric sensing element 132. In general, the reflected light rays 114 are filtered as they pass through the selected filter to be received by a photo-electric sensing element 132. In response to the filtered light rays, the photo-electric sensing element produces an electrical current signal on line pair 134, which is coupled to analog electronic processing and adjustment circuits. The photo-electric sensing element is adapted so that magnitude of the electrical current signal is substantially proportional to the intensity of the light rays 130 sensed by the photo-electric sensing element 132.

The analog processing and adjustment circuits produce a color density value in response to the electrical current signal received. The color density value is then displayed on a display device coupled to the processing and adjustment circuits. For example, as shown in FIG. 1, an amplifier 136 produces an output voltage in response to receiving the electrical current signal on the line pair 134. A first calibration parameter is varied by adjusting gain of the amplifier 136, thereby varying magnitude of the output voltage on voltage signal line 138. Gain adjustment circuitry of the amplifier is representatively shown as a first adjustable resistance 139 in FIG. 1. The output voltage from the amplifier on line 138 is applied as an input signal to a logarithmic voltage converter 140. The logarithmic voltage converter is adapted to provide an output on an output line 142, which corresponds to the optical density measurement for the object sample and the particular configuration of the spectral filter arrangement 116. A second calibration parameter is varied by adjusting gain of the logarithmic voltage converter 140, thereby varying magnitude of the voltage on signal line 142. Gain adjustment circuitry of the logarithmic voltage converter is representatively shown as an adjustable resistance 144 in FIG. 1. A display device 146 is coupled to the output line 142 for displaying the optical density measurement.

Although the constituent components of densitometers are constructed to conform to rigid standards, minor calibration of the densitometer is needed periodically to compensate for small variations and drift of the constituent components. By performing small calibration adjustments, each densitometer can be made to produce color density measurements of the object sample under test that are in close agreement with those produced by every other densitometer. To correct for small variations and drift, the analog processing and adjustment circuits of the densitometer are typically constructed so that a few calibration parameters can be varied, thereby producing small calibration adjustments. For example, adjustment circuits 139, 144 of the amplifier and logarithmic converter shown in the densitometer of FIG. 1 provide for relatively small calibration adjustments by varying the first and second calibration parameter. Similarly, other standard densitometers provide additional small calibration adjustments by additionally varying a third and fourth calibration parameter. Calibration of standard densitometers is relatively simple because densitometer components are already constructed to conform to rigid uniform standards. However, as discussed previously, such construction greatly adds to the size, weight, maintenance, and cost of densitometer components and to overall size, weight, maintenance and cost of the densitometer.

The electronic printer industry has faced a great challenge to produce small, lightweight, reliable, inexpensive color printers capable of faithfully rendering color images, despite normal variations in paper stock and in ink color, dot size, and density. The development of an improved digital color printer, capable of self-calibration in the field and able to render correct color reproductions, would represent a major technological advance. The accurate and detailed color images that such a printer could produce would satisfy a long-felt need within the industry and offer to a large number of users a versatile, faithful and inexpensive color printing device.

SUMMARY OF THE INVENTION

The present invention provides a method and apparatus that overcomes the problem of inaccurate reproduction caused by variations in inks, papers and printer tolerances. The printer includes an optical sensor assembly, an analog-to-digital converter, a computer, a color correction method or look-up table and a digital halftone method or look up table, both in memory, and printing mechanism comprising a print head and its associated electronics.

To perform field calibration of the printer before printing with a new ink or on new paper, the optical sensor assembly is first calibrated. The sensor assembly is calibrated by constructing a transformation matrix of adjustment values based upon the assembly optically sensing colors of a known color gamut through various sensor filters of the assembly. The various sensor filters each have a respective spectral transmittance characteristic. The gamut is either built-in or external to the printer, and includes one or more color patches.

Once the optical sensor assembly has been calibrated, the printing mechanism is calibrated. First the printing mechanism prints a color print test pattern. Then the calibrated sensor assembly optically senses through the newly printed test pattern through the various spectral filters of the assembly. The sensor assembly includes photo-electric sensing elements optically coupled to the spectral filters for generating electric signals in response to light transmitted through the spectral filters. In general, the analog to-digital converter is coupled to sensor assembly for converting the electric signals into sensor values in digital format. The computer includes a print control processor (PCP) coupled to the analog to digital converter to receive the sensor values. Accordingly, sensor values based on the color print test pattern are received by the PCP, which then responds by generating calibrated color density values based on the transformation matrix and the received sensor values.

The PCP then creates one or more look-up tables or method parameters based on the calibrated color density values. First, the PCP generates a color-correction table, then the PCP employs the color-correction table while modifying image color information so as to account for variations in dot size, density or color resulting from ink/paper interactions and printer tolerances. In addition, the PCP implements a chosen digital halftone algorithm or look-up table. Once the look-up tables and/or algorithms have been regenerated using the color print test pattern information, the PCP modifies the image data file to reflect new printing conditions. The resulting correction process makes adjustments both to the color data and to the method of converting that data to the appropriate distribution of printed dots of ink on paper.

The optical sensor assembly is compactly and inexpensively fabricated from photo-electric sensor elements, sensor filters and a broad spectrum light source. The resulting sensor and associated gamut and print test pattern provide an inexpensive and durable apparatus for performing field calibration of any digital color printer. The simple structure, borrowing existent printer control electronics for information processing, eliminates the need for costly and bulky laboratory-style calibration equipment. In addition, the method and apparatus for self calibration are suitable for any digital color printing process. The Self Calibrating Color Printer disclosed and claimed in this patent application provides an advanced, highly accurate and relatively inexpensive instrument for faithful reproduction of detailed color images.

An appreciation of other aims and objectives of the present invention and a more complete and comprehensive understanding of this invention may be achieved by studying the following description of a preferred embodiment and by referring to the accompanying drawings.

DESCRIPTION OF A PREFERRED EMBODIMENT

Figure 1:
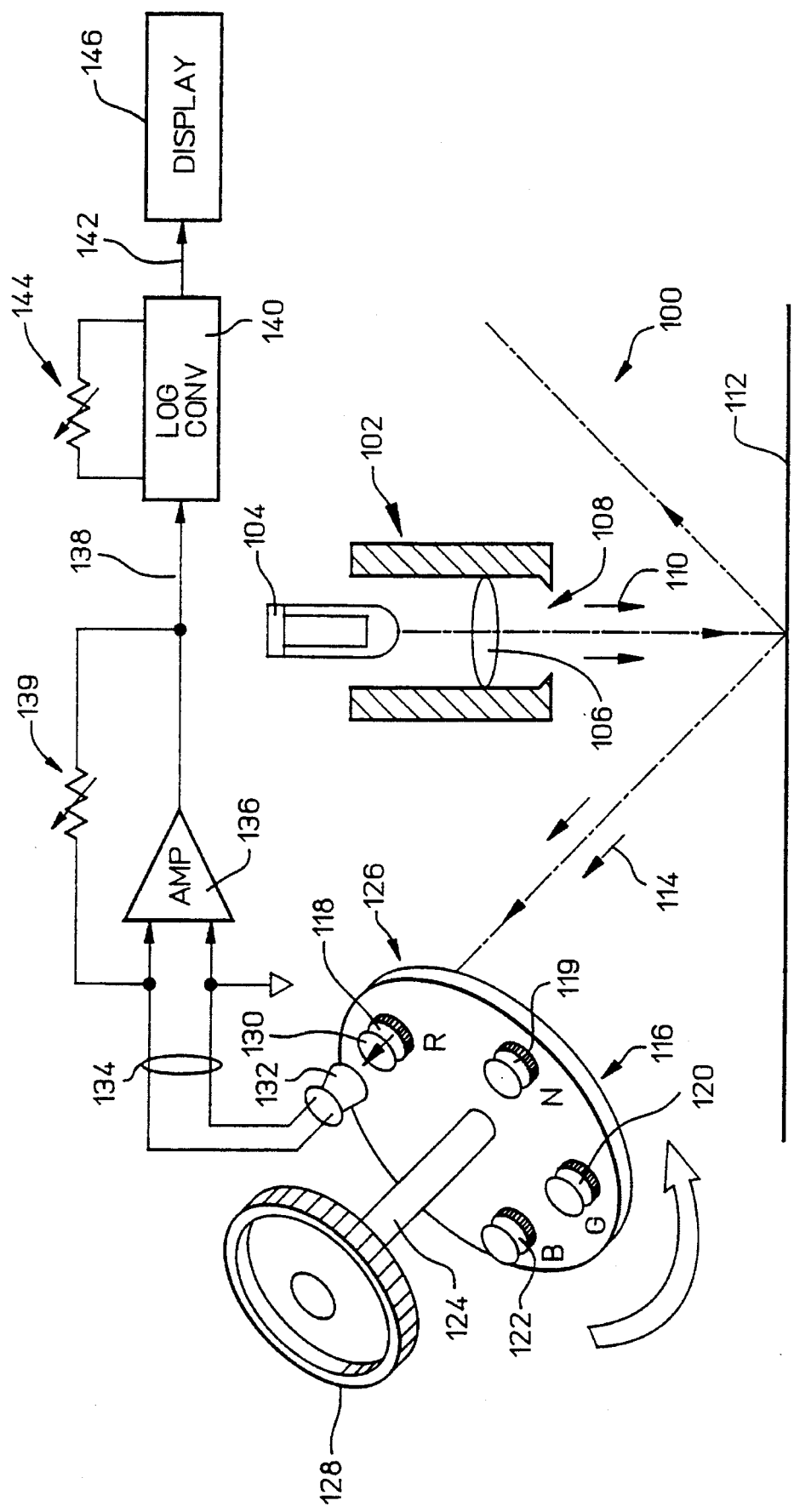
FIG. 1 is a partial block diagram illustrating components and operation of a standard densitometer.
Figure 2:
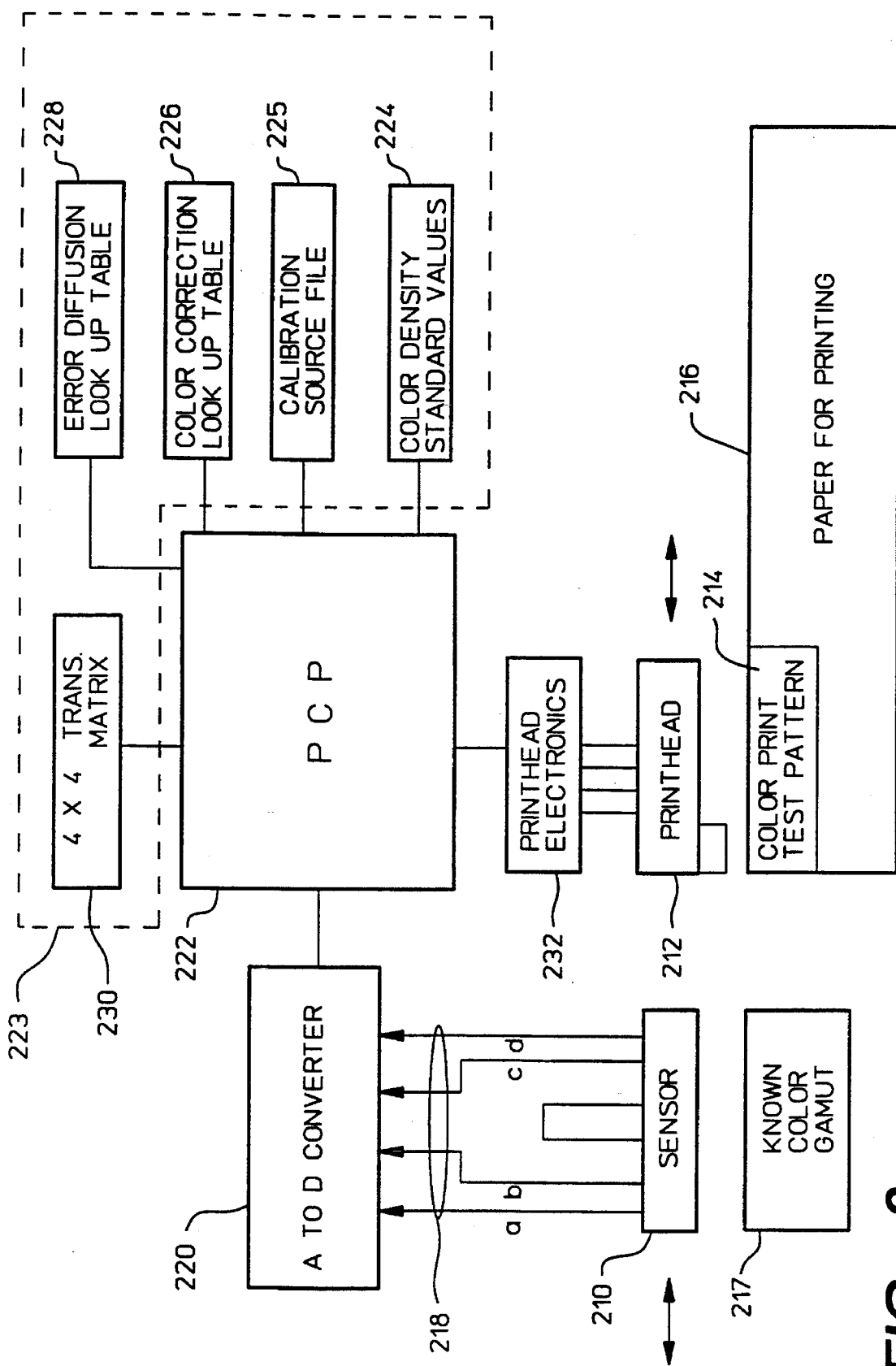
FIG. 2 is a schematic block diagram of a self calibrating color printer.

FIG. 2 is a schematic block diagram of a Self-Calibrating Color Printer embodying the apparatus and methods of the present invention. In accordance with the present invention a computer controls a printing mechanism, which prints by selectively applying colorants to a suitable printing substrate. As shown, the printing mechanism includes a print head electronics unit 232 coupled to a color print head 212 for printing upon paper 216. The computer includes a print control processor (PCP) 222 coupled to a memory device 223. The print control processor is coupled to the print head electronics unit to control printing operations. The PCP has access to memory blocks of the memory device, which are used to respectively store a set of color density standard values, a calibration source file 225, a color correction look-up table 226, an error-diffusion look-up table 228 and a 4 by 4 transformation matrix 230.

An inexpensive and reliable optical sensor assembly 210 is coupled to an analog to digital converter 220, such as an Advanced Micro Devices AM6112 12 bit A/D converter. As shown in FIG. 2, lines 218a through 218d, transmit electric signals from each photo-electric sensing element of the sensor assembly 210 to the analog-to-digital converter 220. The analog to digital converter converts the electric signals to sensor values in digital format of desired precision. In general, the sensor values comprise a neutral sensor value, a red sensor value, a green sensor value, and a blue sensor value. The Printer Control Processor 222, essentially a microprocessor, receives the sensor values and constructs appropriate calibration tables as discussed later herein. The PCP 222 may be constructed according to any familiar processing architecture, allowing the processor 222 to follow machine language instructions for processing data and controlling apparatus.

As will be discussed in greater detail later herein, in performing self-calibration the color printer uses the sensor assembly to individually analyze a known color gamut 217 and a color print test pattern 214. The color print test pattern comprises patches of various patterns of ink dots printed by the printing mechanism. These patches are generated so as to include the range of possible ink coverage and multicolor overprints which are employed in printing color images.

In the preferred embodiment, the sensor assembly includes four sensing element/filter pairs, wherein each pair is respectively used to sense one of the neutral, red, green and blue (N, R, G, B) color densities of any object being analyzed. The present calibration method uses actual printer behavior to provide an accurate source of information for corrective methods. Accordingly, the sensor assembly senses color density of the known color gamut 217 to calibrate the sensor against known color density standard values of the gamut stored in the memory. Once calibrated, the sensor assembly senses color density of the color print test pattern 214 to provide data needed to calibrate the printing mechanism.

Figure 3:
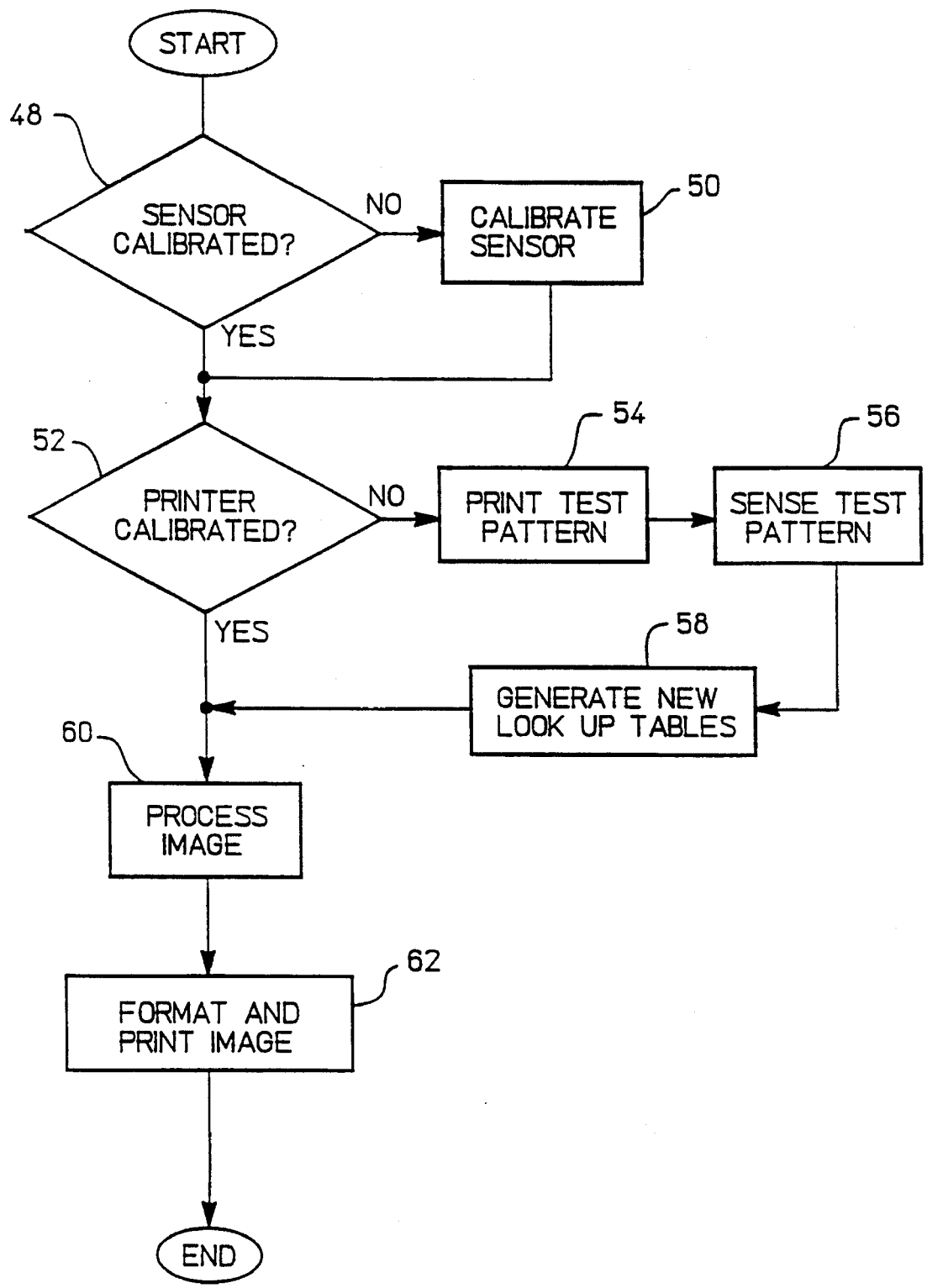
FIG. 3 is a block flow chart illustrating a method of calibration and printing used in conjunction with the color printer shown in FIG. 2.

FIG. 3 is a block flow chart illustrating a method of calibration and printing used in conjunction with the color printer shown in FIG. 2. An initial step of the method is to calibrate the sensor, as shown in step 50 of FIG. 3. If the sensor assembly is already calibrated, determined at step 48 of FIG. 3, the sensor calibration step may be skipped. In order to calibrate the sensor assembly, the print control processor constructs the transformation matrix, which is expressed compactly in these discussions as $\bar{t}$. The transformation matrix is used in transforming the four sensor values from the analog to digital converter into calibrated color density values. The transformation matrix is constructed so that the calibrated color density values generated in the field closely approximate color density values measurable by a factory standard densitometer. Hence, the transformation matrix allows the inexpensive and reliable optical sensor 210 to be used in emulating the much more expensive and less reliable standard densitometer.

Preferably, the set of color density standard values are derived from measurements previously generated at a central facility and are stored in the memory device for later retrieval during field calibration. For example, the color density standard values are derived from the standard densitometer measuring color density of each patch or representative patch of the color gamut at the factory. It is preferred that the color gamut comprises four patches so that a first, second, third and fourth patch of the color gamut are measured by the standard densitometer to respectively produce a first, second, third and fourth constituent subset of the set of color density standard values, which are expressed herein as the respective matrices $\bar{D}_1$, $\bar{D}_2$, $\bar{D}_3$, and $\bar{D}_4$. The matrices $\bar{D}_1$, $\bar{D}_2$, $\bar{D}_3$, and $\bar{D}_4$ are characterized as four by one matrices, each matrix including four respective elements corresponding to Neutral, Red, Green and Blue (NRGB) color density measurements of the respective patches. As shown in FIG. 2, the set of color density standard values 224 are stored in the memory device of the printer for use during calibration of the sensor assembly.

In accordance with the flow chart shown in FIG. 3, during the calibrate sensor step 50 the printer control processor positions the optical sensor successively over each of four patches of the known gamut, generating constituent sub-sets of a first set of sensor values by sensing color density of each patch. Electric signals from each photo-electric sensing element of the sensor assembly are converted to sensor values by the analog to digital converter. Accordingly, four sub-sets comprising NRGB sensor values are produced. A first sub-set including NRGB sensor values corresponding to a first patch of the color gamut is expressed herein as a four by one matrix $\overline{V}_1$. Similarly a second, third and fourth sub-set including NRGB sensor values respectively corresponding to a second, third and fourth patch of the color gamut, are expressed herein as respective four by one matrices $\overline{V}_2$, $\overline{V}_3$, and $\overline{V}_4$.

For each of the four color patches of the color gamut, the print control processor generates a respective set of four equations, thereby yielding a total of sixteen equations which are discussed herein as four sets of four equations. The sixteen equations are based on practical simplified models of the densitometer and sensor assembly as discussed in greater detail later herein. Since the sensor assembly includes four filter/sensor pairs, at least four patches are needed to calibrate the sensor assembly. In the preferred embodiment the gamut advantageously includes only four color patches (neutral, cyan, yellow, magenta), thereby conserving resources such as space and sensing time while still providing sufficient basis for solving the sixteen equations. The four sets of four equations generated by the PCP are written using standard matrix notation to express preferred base 10 logarithms of products of matrix multiplication such that:

$$\overline{D}_1 = -\log(\overline{t} \times \overline{V}_1)$$

$$\overline{D}_2 = -\log(\overline{t} \times \overline{V}_2)$$

$$\overline{D}_3 = -\log(\overline{t} \times \overline{V}_3)$$

$$\overline{D}_4 = -\log(\overline{t} \times \overline{V}_4)$$

where $\overline{D}_1$, $\overline{D}_2$, $\overline{D}_3$, $\overline{D}_4$, $\overline{V}_1$, $\overline{V}_2$, $\overline{V}_3$, $\overline{V}_4$ and $\overline{t}$ are as described previously. The PCP is suitably programmed to construct the transformation matrix by solving the sixteen equations for sixteen unknown adjustment constants of the transformation matrix. Once the four by four transformation matrix 230 is constructed, the sensor assembly 210 is calibrated.

Calibration of the sensor assembly is a relatively sophisticated major calibration. Such major calibration is needed in the preferred embodiment because the sensor assembly includes inexpensive components that are constructed independently of rigid densitometer component standards. Accordingly, the four by four transformation matrix includes the sixteen adjustment constants that compensate for substantial variations and drift of sensor assembly component characteristics relative to densitometer component standards.

The calibrated sensor is used during calibration of the printing mechanism, which comprises printing the color print test pattern, sensing the color print test pattern with the calibrated sensor, and generating new calibration tables. Such steps may be skipped if the printhead is already calibrated for the paper stock and ink used in printing, as determined at step 52 of FIG. 3. The color print test pattern 214 is printed (at step 54), the pattern consisting of patches of one, two and three ink color combinations. The print head may follow any printing technology of applying colorants, for example laser printing, liquid crystal light valve printing, etc. For simplicity in describing the preferred embodiment, a color ink jet print head is described. An ink jet print head comprises a collection of ink jet heads and ink reservoirs, one head/reservoir pair for each printed ink. While the methods of the present invention are described for a four color printer, those skilled in the art will recognize that the same methods and apparatus may be adapted to print any number of colors and may also be employed in gray scale printers which produce finely shaded gray output.

During the Sense Test Pattern step 56, the printer control processor controls positioning of the optical sensor so that the sensor is successively positioned over each patch of the color print test pattern, generating constituent sub-sets of a second set of sensor values by sensing color density of each patch. Electric signals from each photo-electric sensing element of the sensor assembly are converted to sensor values by the analog to digital converter. In general, the print control processor executes suitable instructions, employing the transformation matrix to transform respective sub-sets of sensor values into calibrated color density values for each patch of the color print test pattern. Specifically, for each patch of the print test pattern, the print control computes minus 1 times the logarithm of the matrix product of the transformation matrix and the sub-set of sensor values corresponding to each patch, thereby generating calibrated color density values for each patch. Because the sensor assembly has been calibrated, the calibrated color density values derived from the color print test pattern are in close agreement with those that would otherwise be measured at the factory using the standard densitometer. The PCP then records the calibrated color density values of the color print test pattern as data in a calibration source file (CSF) 225.

In accordance with step 58 of the flow chart of FIG. 3, the printer control processor uses the calibration source file data 225 to generate the color correction look up table and the error diffusion look up table, which are used during normal printing operations. First, the print control processor generates the color-correction look-up table by performing first or second-order chi-squared polynomial fits on the data in the calibration source file. In other words, the processor uses an appropriate regression technique on the calibrated color density values estimated for the patches of the color print test pattern in order to calculate appropriate functional expansions of a given ink quantity in terms of a polynomial expansion of primary-filter densities. For example, the processor calculates appropriate functional expansions of cyan ink quantity in terms of a polynomial expansion of Red, Green, Blue and Neutral filter densities. When printing an image during normal operation of the printer, each of the image's pixels are described by a set of RGB color densities. The color-correction look-up table converts each of these standard RGB color densities to appropriate cyan, magenta, yellow and black ink primary-filter densities, using the calculated polynomial expansions derived during the calibration step 58. The primary-filter density of a particular ink is the density as measured through a complementary color filter. For example, cyan ink absorbs strongly in the red region of the spectrum and its presence is most effectively registered using a red filter.

Once calculated for the printer, the print head-specific primary-filter densities are half-toned according to the Floyd and Steinberg algorithm to printable grey densities. For quickly implementing the error-diffusion algorithm, the algorithm parameters, as modified by the calibration source file data 225, may be stored in the error diffusion look-up table. In the preferred embodiment, the Floyd and Steinberg algorithm, which can be used in both black and white (grey scale) printers as well as multicolor applications, is implemented to achieve a truer printed color density at a paper location by spreading printer errors to neighboring pixels. As is especially true for digital printers, most printers can not print a continuously variable amount of ink. Instead, discrete dot sizes are deployed. If one desires to place a given dot size, to achieve a given color, which does not correspond to the printer's limited set of discrete dot sizes, a color density error results between the printed dot and the desired dot. The Floyd and Steinberg algorithm is one method for spreading that error to neighboring pixels. The neighboring pixel, now being a sum of its previous value and the spread error, is in turn resolved into the closest available printed dot size and a residual error which again is spread to its neighboring pixels.

The success of any such method of spreading errors in printed colors depends upon accurate knowledge of available printed color densities. Again, variability in printer, ink and paper alter the discrete printed dot sizes (and color densities), affecting the calculations of what nearest dot size to print and how big an error must be spread. In the preferred embodiment, information gained during the printer calibration step 58 updates the Floyd and Steinberg algorithm by accurately providing the available color dot sizes and densities, allowing an accurate decomposition of each image pixel into a printable dot and an error to be spread. As described, the error diffusion look-up table is generated from calibration source file data to provide accurate threshold levels for available dot sizes in all printable colors. Therefore, once the color-correction look-up table enables a decomposition of a pixel's desired color into printable inks, the error diffusion look-up table allows an individual pixel's list of ink densities to be further decomposed into discrete ink dot sizes and spreadable ink density errors. Once the look-up tables have been generated, printer calibration is completed.

In accordance with block 60 of the flow chart of FIG. 3, images are processed for printing by applying first the color correction look up table and then the error diffusion look-up table to each pixel in the image. After the image is processed, the processor formats the image data with printer specific format commands and then drives the print head with these commands using the print head electronic control assembly, in accordance with block 62. The printhead moves across the paper, printing the color-corrected and error-diffused color image. Printing of the color-corrected and error-diffused color image continues until completion.

Figure 4A:
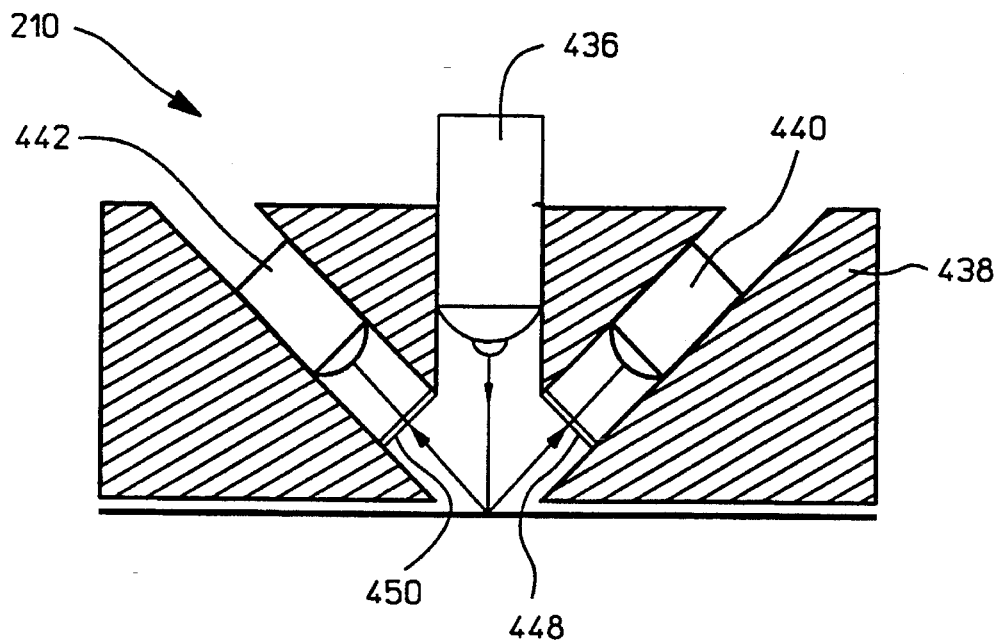
FIG. 4a is a detailed cutaway side view of the optical sensor assembly shown as part of the printer in FIG. 2.
Figure 4B:
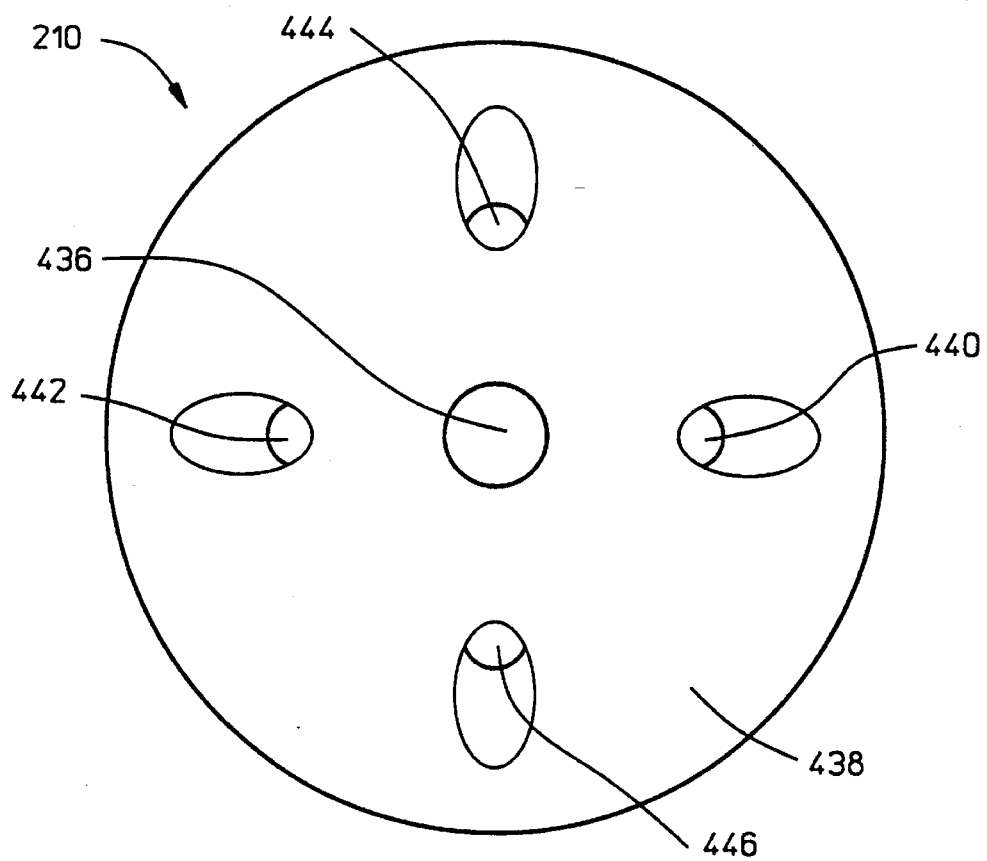
FIG. 4b is a detailed top view of the optical sensor assembly shown as part of the printer in FIG. 2.

FIGS. 4A and 4B illustrate a preferred embodiment of the optical sensor assembly 210 discussed previously with respect to FIG. 2. Components of the sensor assembly 210 include a housing 438, a light source 436 centrally mounted therein, and one or more of the photo-electric sensing elements 440, 442, 444, 446 mounted in the housing 438 adjacent to the light source 436. As shown in FIG. 4A, the light source 436 of the sensor assembly is centrally mounted in the housing so that the light produced thereby is projected onto the object being analyzed, positioned adjacent to the assembly. An optical axes of the light source and a respective optical axis of each of the sensing elements converge at a single point, which is in substantially the same plane as the object positioned adjacent to the assembly. It is prefered that the optical axis of the source is directed colinearly with a normal of the plane of the object, and that the respective optical axis of each of the detectors is directed at a respective 45 degree angle along the normal of the plane of the object. The filters and sensors of the assembly are mounted in the housing so that a respective portion of light reflected from the substrate is transmitted through each of the filters to be detected by a respective one of the sensors. In the preferred embodiment, each of the photo-electric sensing elements respectively comprises an inexpensive photo-diode.

Each sensing element 440, 442, 444, 446 is mounted in the housing so as to receive reflected light through a respective one of a plurality of associated spectral filters. For example, FIG. 4A shows a first sensing element 440, which receives reflected light through a neutral sensor filter 448, and a second sensing element 442, which receives reflected light through a red sensor filter 450. Similarly, a third sensing element 444 receives reflected light through a green sensor filter (not shown), and a fourth sensing element 446 receives reflected light through a blue sensor filter (not shown).

As discussed herein, in the preferred embodiment, components of the optical sensor differ from components of a densitometer in numerous important ways. Unlike the densitometer, the sensor assembly 210 includes components that are small, light weight, reliable, relatively inexpensive, and constructed independently of rigid densitometer component standards. As discussed previously, constructing densitometer components in conformance with such rigid standards greatly adds to the size, weight, maintenance and cost of densitometer components and to overall size, weight, maintenance and cost of the densitometer. In conformance with densitometer component standards, the light source is constructed to maintain long term stability of a particular spectral energy distribution. For example, the standards have previously been described in terms of a tungsten filament lamp providing an influx from the lamp operating at a Plankian spectral energy distribution of 3000 degrees Kelvin. An illustrative standard for the densitometer light source illuminant is known in the industry as 2856K ANSI (American National Standard Institute). Because of the high temperature of operation, the 3000 degree tungsten filament lamp has a reduced Mean Time Between Failure (MTBF) and must be frequently replaced as part of a laboratory equipment maintenance schedule. While such maintenance requirements can be tolerated in equipment used in centralized facilities such as laboratories and factories, they would be quite inconvenient in equipment used by consumers for field calibration of color printers.

Though the standard spectral energy distribution of the densitometer light source includes values that span the wavelengths of the visible spectrum, the entire spectral distribution of the densitometer light source is expressed compactly herein as $\overline{E}$. It is theorized that the standard spectral energy distribution of the densitometer light source is properly expressed by an n×n matrix, using standard matrix notation, such that:

$$\overline{E} = \begin{matrix} E(\lambda_1) & 0 & 0 & \ldots & 0 \\ 0 & E(\lambda_2) & 0 & \ldots & 0 \\ \vdots & \vdots & \vdots & \ldots & \vdots \\ 0 & 0 & 0 & \ldots & E(\lambda_n) \end{matrix}$$

where $E(\lambda_1)$ represents spectral energy at a first wavelength $\lambda_1$, $E(\lambda_2)$ represents spectral energy at a second wavelength $\lambda_2$, and so on. In general, $E(\lambda_n)$ represents spectral energy of the standard densitometer light source illuminant at an nth wavelength $\lambda_n$.

Unlike the densitometer illuminant, the centrally mounted light source 436 of the preferred embodiment of the sensor assembly is relatively inexpensive and constructed independently of rigid densitometer component standards. For example, in the preferred embodiment of the present invention the centrally mounted light source includes an inexpensive lens-end incandescent lamp providing a spectral energy distribution having a peak corresponding to a temperature of only approximately 2000 degrees Kelvin. Accordingly, the light source of the preferred embodiment of the sensor assembly has a spectral energy distribution that is substantially different from that of any standard densitometer light source illuminants. Furthermore, the light source of the preferred embodiment of the sensor assembly has a drift rate that is substantially outside corresponding ranges of any standard densitometer light source illuminants.

Though the inexpensive lamp of the preferred embodiment of the sensor assembly is not specifically constructed to conform to densitometer component standards, the inexpensive lamp is still capable of producing adequate quantities of light in the whole visible spectrum. Since the sensor is conveniently and calibrated in the field, such calibration is repeated periodically to avoid difficulties that would otherwise be caused by the drift rate of the sensor assembly light source. The inexpensive lamp has a longer mean time between failure than that of standard densitometer light sources, in part because the filament of the inexpensive lamp operates at a lower temperature than that of standard densitometer light sources.

Though the spectral energy distribution of the sensor assembly light source includes values that span the wavelengths of the visible spectrum, the spectral distribution of the sensor light source is expressed compactly herein as $\bar{e}$. It is theorized that the spectral energy distribution of the sensor assembly light source is properly expressed by an n×n matrix, using standard matrix notation, such that:

$$\bar{e} = \begin{matrix} e(\lambda_1) & 0 & 0 & \ldots & 0 \\ 0 & e(\lambda_2) & 0 & \ldots & 0 \\ \vdots & \vdots & \vdots & \ldots & \vdots \\ 0 & 0 & 0 & \ldots & e(\lambda_n) \end{matrix}$$

where $e(\lambda_1)$ represents spectral energy at the first wavelength $\lambda_1$, $e(\lambda_2)$ represents spectral energy at the second wavelength $\lambda_2$, and so on. In general, $e(\lambda_n)$ represents spectral energy of the sensor assembly light source at the nth wavelength $\lambda_n$. Accordingly, it should now be clear that the light source of the sensor assembly, having a spectral energy distribution $\bar{e}$, is distinguished from any standard densitometer light source illuminant, having the standard spectral energy distribution $\bar{E}$.

Similarly, in the preferred embodiment, the filters of the sensor assembly are distinguished from densitometer filters. Densitometer filters are relatively expensive, in part because they are constructed to have spectral transmittance characteristics in conformance to a particular densitometer filter standard. For example, one illustrative densitometer filter standard is known in the art as the ANSI Status T Color response. It is theorized that during operation of the densitometer, the spectral transmittance characteristics of each of the densitometer filters is scaled by the optical frequency response of the densitometer photo-electric sensing element. Accordingly, it is theorized that a combined system response of the densitometer filters and the densitometer photo-electric sensing elements is properly described by a set of standard sensor sensitivity characteristics of the densitometer. Though the set of standard sensor sensitivity characteristics includes values that span the wavelengths of the visible spectrum, the set is expressed compactly herein as $\bar{S}$. It is theorized that the set of standard sensor sensitivity characteristics of the densitometer is properly expressed by a 4×n matrix, using standard matrix notation, such that:

$$\bar{S} = \begin{matrix} N(\lambda_1) & \ldots & N(\lambda_n) \\ R(\lambda_1) & \ldots & R(\lambda_n) \\ G(\lambda_1) & \ldots & G(\lambda_n) \\ B(\lambda_1) & \ldots & B(\lambda_n) \end{matrix}$$

where $N(\lambda_1)$ represents standard sensitivity of a neutral densitometer filter/sensing element combination at the first wavelength $\lambda_1$, $R(\lambda_1)$ represents standard sensitivity of a red densitometer filter/sensing element combination at the first wavelength $\lambda_1$, $G(\lambda_1)$ represents standard sensitivity of a green densitometer filter/sensing element combination at the first wavelength $\lambda_1$, and $B(\lambda_1)$ represents standard sensitivity of a blue densitometer filter/sensing element combination at the first wavelength $\lambda_1$. In general, $N(\lambda_n)$ represents standard sensitivity of the neutral densitometer filter/sensing element combination at the nth wavelength $\lambda_n$, $R(\lambda_n)$ represents standard sensitivity of the red densitometer filter/sensing element combination at the nth wavelength $\lambda_n$, $G(\lambda_n)$ represents standard sensitivity of the green densitometer filter/sensing element combination at the nth wavelength $\lambda_n$, and $B(\lambda_n)$ represents standard sensitivity of the blue densitometer filter/sensing element combination at the nth wavelength $\lambda_n$.

In the preferred embodiment, the filters of the sensor assembly are relatively inexpensive filters that are constructed independent of rigid densitometer standards. Accordingly, in the preferred embodiment, each sensor filter has a respective spectral transmittance characteristic that is substantially different from that of any standard densitometer filter. In the preferred embodiment, the filters of the sensor assembly are constructed of suitable light weight plastics. It is theorized that during operation of the sensor assembly, the spectral transmittance characteristics of each of the sensor filters is appropriately scaled by the optical frequency response of the respective photo-electric sensing element. Accordingly, it is theorized that a combined system response of the sensor filters and the photo-electric sensing elements of the sensor assembly is properly described by a set of sensor sensitivity characteristics. Though the set of sensor sensitivity characteristics includes values that span the wavelengths of the visible spectrum, the set is expressed compactly herein as $\bar{s}$. It is theorized that the set of sensor sensitivity characteristics is properly expressed by a 4×n matrix, using standard matrix notation, such that:

$$\bar{s} = \begin{matrix} n(\lambda_1) & \ldots & n(\lambda_n) \\ r(\lambda_1) & \ldots & r(\lambda_n) \\ g(\lambda_1) & \ldots & g(\lambda_n) \\ b(\lambda_1) & \ldots & b(\lambda_n) \end{matrix}$$

where $n(\lambda_1)$ represents sensitivity of a neutral sensor filter/sensing element pair at the first wavelength $\lambda_1$, $r(\lambda_1)$ represents sensitivity of a red sensor filter/sensing element pair at the first wavelength $\lambda_1$, $g(\lambda_1)$ represents sensitivity of a green sensor filter/sensing element pair at the first wavelength $\lambda_1$, and $b(\lambda_1)$ represents sensitivity of a blue sensor filter/sensing element pair at the first wavelength $\lambda_1$. In general, $n(\lambda_n)$ represents sensitivity of the neutral sensor filter/sensing element pair at the nth wavelength $\lambda_n$, $r(\lambda_n)$ represents sensitivity of the red sensor filter/sensing pair combination at the nth wavelength $\lambda_n$, $g(\lambda_n)$ represents sensitivity of the green sensor filter/sensing element pair at the nth wavelength $\lambda_n$, and $b(\lambda_n)$ represents sensitivity of the blue sensor filter/sensing element pair at the nth wavelength $\lambda_n$.

The sensor housing 438 shown in FIGS. 4A and 4B supports the light source 436, the sensing elements 440, 442, 444, 446, and the associated sensor filters in proper alignment, allowing the sensor assembly 210 to move as a rugged unit across the color print test pattern 214 and the color gamut 217 shown in FIG. 2. It should be noted that movement in the printer need only be relative movement, for example between the sensor assembly and the test pattern, or between the print head and the paper. While the present embodiment describes a sensor and print head moving across paper, those skilled in the art will recognize that the paper may instead be configured to move across a stationary sensor and print head. Hence, a "movable" sensor (or print head) as used throughout the description and claims also embraces the relative movement between a stationary sensor (or print head) and moving paper or moving gamut.

Figure 5:
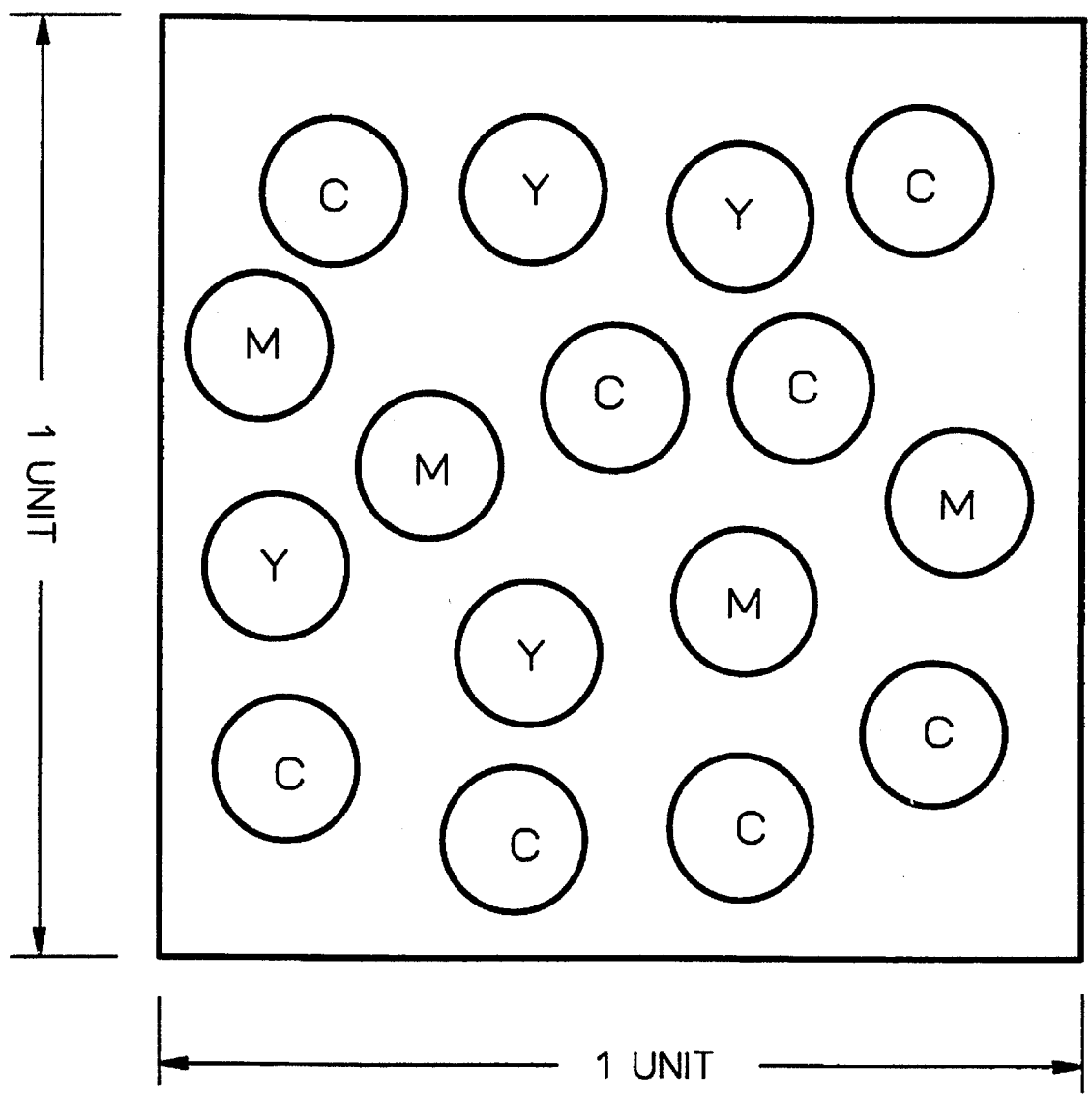
FIG. 5 is a simplified and enlarged diagram representing dots of cyan, yellow and magenta inks printed on a unit square portion of a sheet of paper.

The light source of the sensor assembly is used to respectively illuminate the color gamut 217 and the color print test pattern 214 as they are each individually analyzed by the sensor, as discussed previously. The color print test pattern correspond to the colors and dot sizes which the particular color print head 212 can produce. In the preferred embodiment, the ink jet print head uses four inks: cyan, yellow, magenta and black. In another preferred embodiment, the ink jet print head uses three inks: cyan, yellow, and magenta. A simplified and enlarged diagram showing dots of cyan, yellow and magenta inks printed on a unit square portion of the sheet of paper is shown in FIG. 5. For the purposes of clear illustration, dots are shown in FIG. 5 as circles that are clearly separated and non-overlapping on a 1 unit square of paper. However, it should be understood that such separation is shown only for the sake of clarity, since during normal printing the size and location of the dots are selected to produce particular color appearances, resulting in overlap of at least some of the dots. For the purposes of illustration, each dot of FIG. 5 is notionally labeled with a C for cyan, a Y for yellow, or an M for magenta.

It is theorized that the paper and the inks each have a respective spectral reflectance characteristic spanning the wavelengths of the visible spectrum. A set including the respective spectral reflectance characteristics of the paper and the inks is expressed compactly herein as $\overline{R}$. It is theorized that the set of spectral reflectance characteristics is properly expressed by a n×4 matrix, using standard matrix notation, such that:

$$\overline{R} = \begin{matrix} Rc(\lambda_1) & Ry(\lambda_1) & Rm(\lambda_1) & Rp(\lambda_1) \\ \vdots & \vdots & \vdots & \vdots \\ Rc(\lambda_n) & Ry(\lambda_n) & Rm(\lambda_n) & Rp(\lambda_n) \end{matrix}$$

where $Rc(\lambda_1)$ represents reflectance of the cyan ink at the first wavelength $\lambda_1$, $Ry(\lambda_1)$ represents reflectance at the first wavelength $\lambda_1$, $Rm(\lambda_1)$ represents reflectance of the magenta ink at the first wavelength $\lambda_1$, and $Rp(\lambda_1)$ represents reflectance of the paper at the first wavelength $\lambda_1$. In general, $Rc(\lambda_n)$ represents reflectance of the cyan ink at the nth wavelength $\lambda_n$, $Ry(\lambda_n)$ represents reflectance of the yellow ink at the nth wavelength $\lambda_n$, $Rm(\lambda_n)$ represents reflectance of the magenta ink at the nth wavelength $\lambda_n$, and $Rp(\lambda_n)$ represents reflectance of the paper at the nth wavelength $\lambda_n$.

As discussed previously with respect to FIG. 5, during printing the size and location of the ink dots deposited on the paper are selected to produce particular color appearances. Accordingly, it is theorized that it is useful to describe the dots of cyan, yellow and magenta inks printed on the unit square of sheet of paper in terms of a set of areas of bare paper and coverages of each ink normalized relative to the area of the unit square. The set is expressed compactly herein as $\overline{Q}$. It is theorized that the set of relative areas is properly expressed by a 4×1 matrix, using standard matrix notation, such that:

$$\overline{Q} = \begin{matrix} Qc \\ Qy \\ Qm \\ Qp \end{matrix}$$

where Qc is a relative area coverage of cyan ink, Qy is a relative area coverage of yellow ink, Qm is a relative area coverage of magenta ink, and Qp is a relative area of bare paper uncovered by ink.

It is theorized that if the standard densitometer is used to analyze the sheet of paper having inks applied thereto as exemplified in FIG. 5, then the standard densitometer would produce a corresponding matrix of color density values expressed compactly herein as $\overline{D}_0$ such that:

$$\overline{D}_0 = \begin{matrix} N_0 \\ R_0 \\ G_0 \\ B_0 \end{matrix}$$

wherein $N_0$ is a neutral color density value produced by the densitometer, $R_0$ is red color density value produced by the densitometer, $G_0$ is green color density value produced by the densitometer, and $B_0$ is blue color density value produced by the densitometer. Since the size and location of the ink dots deposited on the paper are selected to produce particular color appearances during printing, a practical simplified model of the operation of the densitometer predicts that variability in color density measured by the densitometer is based on variations in the members of the set of relative quantities of paper and inks. Accordingly, it is theorized that the practical densitometer model is provided by matrix products of relevant densitometer characteristics that have been discussed herein, such that:

$$\overline{D}_0 = -\log((\overline{S} \times \overline{E} \times \overline{R}) \times \overline{Q})$$

where, as discussed previously, $\overline{S}$ is the set of standard sensor sensitivity characteristics of the densitometer, $\overline{E}$ is the spectral distribution of the densitometer light source, $\overline{R}$ is the set including the respective spectral reflectance characteristics of the paper and the inks, and $\overline{Q}$ is the set of relative quantities of paper and inks.

Similarly, it is theorized that if the sensor of the present invention were used to analyze the sheet of paper having inks applied thereto as exemplified in FIG. 5, then analog to digital conversion of each signal of the sensor assembly would produce a set of sensor values $\overline{V}_0$, which can be expressed using standard matrix notation such that:

$$\overline{V}_0 = \begin{matrix} Vn_0 \\ Vr_0 \\ Vg_0 \\ Vb_0 \end{matrix}$$

wherein $Vn_0$ is a neutral sensor value, $Vr_0$ is a red sensor value, $Vg_0$ is a green sensor value, and $Vb_0$ is a blue sensor value. Since the size and location of the ink dots deposited on the paper are selected to produce particular color appearances during printing, a practical simplified model of the operation of the sensor assembly predicts that variability in the sensor values is based on variations in the members of the set of relative quantities of paper and inks. Accordingly, it is theorized that the practical sensor model is provided by matrix products of relevant sensor characteristics that have been discussed herein, such that:

$$\bar{V}_0 = \overline{(s + ee\ \bar{x}\bar{e}x\bar{R})x + e, ovs}\ \bar{Q}$$

and therefore $$\bar{t} \times \bar{V}_0 = t + ee\ \times (\text{fheight}\overline{s \bar{x} \bar{e} x \bar{R}}) \times + e, ovs\ \bar{Q}$$

where as discussed previously $\bar{t}$ is the transformation matrix, $\bar{s}$ is the set of sensor sensitivity characteristics, $\bar{e}$ is the spectral energy distribution of the sensor assembly light source, $\bar{R}$ is the set including the respective spectral reflectance characteristics of the paper and the inks, and $\bar{Q}$ is the set of areas of bare paper and coverages of each ink normalized relative to the area of the unit square.

Since the simplified model of the densitometer asserts that variability in measured color density is based on variations in the members of the set of relative quantities of paper and inks, it should be noted that the expression $(\bar{S} \times \bar{E} \times \bar{R})$ can be simplified and expressed using standard matrix notation as a four by four matrix array of sixteen densitometer system constants. Furthermore, since the simplified model of the sensor assembly asserts that variability in sensor values are based on variations in the members of the set of relative quantities of paper and inks, the expression $(\bar{s} \times \bar{e} \times \bar{R})$ can be similarly simplified and expressed using standard matrix notation as a four by four matrix array of sixteen sensor system constants. Because the characteristics of components of the sensor assembly are substantially different from the characteristics of components of the densitometer, the matrix of densitometer system constants are substantially different from the matrix of sensor system constants. However, it is theorized that the sixteen adjustment constants of the 4 by 4 sensor data transformation matrix are such that a matrix product of the matrix of sixteen adjustment constants and the matrix of sixteen sensor system constants is substantially equal to the matrix of sixteen densitometer system constants, so that:

$$(\bar{S} \times \bar{E} \times \bar{R}) = \bar{t} \times (\bar{s} \times \bar{e} \times \bar{R})$$

Therefore, substitution with the two previously discussed expressions:

$$\bar{t} \times \bar{V}_0 = t + ee\ \times (\text{fheight}\overline{s \bar{x} \bar{e} x \bar{R}}) \times + e, ovs\ \bar{Q}$$

and $$\bar{D}_0 = -\log((\bar{S} \times \bar{E} \times \bar{R}) \times \bar{Q})$$

yields the following compact expression of a corresponding set of four equations:

$$\bar{D}_0 = -\log(\bar{t} \times \bar{V}_0)$$

Therefore, for the sheet of paper having inks applied thereto as exemplified in FIG. 5, the matrix of color density values produced by the standard densitometer is substantially equal to minus 1 times the logarithm of the matrix product of the transformation matrix and the matrix expression of the set of sensor values produced using the low cost sensor assembly. Accordingly, the practical simplified models of the densitometer and sensor assembly provides the basis for the sixteen equations used to construct the transformation matrix, as discussed previously.

ALTERNATIVE EMBODIMENTS

As an alternative embodiment, the steps of printing the color print test pattern 54, sensing these pattern 56 and generating new look-up tables 58, discussed previously may proceed in real time: the sensor 210 and print head 212 may operate in tandem as a printing system with feedback. In this manner, as ink dots were being applied, the sensor 210 and printer control processor 222 would observe the resultant color density on the paper or other printing substrate and shut off the print head 212 when the desired density was reached. Real time feedback would in general require a faster and more powerful processing circuit 222, but could prove more efficient and accurate in some printing applications.

The methods and apparatus for self calibration disclosed are applicable to any form of electronic printing where the image data may be obtained in digital format. In particular, the techniques and apparatus described may profitably be employed in laser, liquid crystal light valve, ink jet and grey-scale printers requiring refined control over resultant ink color densities. Although the present invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A digital printing method comprising the steps of:

providing a known color gamut;

measuring color density of the gamut using a standard densitometer and storing resulting color density standard values in a computer;

sensing the gamut using an optical sensor assembly and storing a resulting first set of sensor values in the computer;

using the computer to generate at least a four by four transformation matrix based upon the color density standard values and the first set of sensor values;

printing a print test pattern on a printing substrate;

optically sensing the print test pattern using the optical sensor assembly and storing a resulting second set of sensor values in the computer;

using the computer and the transformation matrix to transform the second set of sensor values into a set of calibrated color density values of the test pattern;

using the computer to generate a set of correction parameters based upon the set of calibrated color density values;

processing a digital image using the computer and the set of correction parameters; and printing the processed digital image.

2. The method of claim 1 wherein the known color gamut is a four color gamut.

3. The method as in claim 2 wherein the transformation matrix is a four by four transformation matrix comprising sixteen adjustment values.

4. The method of claim 1 wherein the sensor assembly includes:

a light source for illuminating an object being sensed;

a plurality of spectral filters comprising:

a red spectral filter for transmitting red light therethrough;

a green spectral filter for transmitting green light therethrough;

a blue spectral filter for transmitting blue light therethrough;

a neutral spectral filter for transmitting light therethrough;

a plurality of photo-electric sensing elements, each of the elements for optically sensing the gamut and the print test pattern through a respective one of the filters.

5. An apparatus for calibrated digital printing comprising:

a printing mechanism adapted for printing upon a substrate;

an optical sensor assembly adapted for sensing colors of a known color gamut and colors of a color print test pattern printed by the printing mechanism onto the substrate, the sensor assembly including at least one photo-electric sensing element and an analog to digital converter coupled to the sensing element for generating a first set of sensor values in response to the sensor sensing the color gamut;

a sensor calibration means coupled to the sensor assembly for calibrating the sensor assembly based upon the known color gamut, the sensor calibration means including:

a memory device for storing a set of color density standard values corresponding to color density of the known gamut; and computation means coupled to the analog to digital converter and the memory device for generating at least a four by four transformation matrix based upon the first set of sensor values and the color density standard values, thereby calibrating the sensor assembly; and a printing calibration means coupled to the printing mechanism and the sensor assembly for calibrating the printing mechanism based upon the calibrated sensor sensing the color print test pattern.

6. An apparatus as in claim 5 wherein:

the set of color density standard values have been generated by means of a standard densitometer measuring color density of the gamut, the standard densitometer including a densitometer light source having a standard spectral energy distribution; and the sensor assembly includes a light source having a spectral energy distribution that is substantially different from that of the densitometer light source.

7. An apparatus as in claim 5 wherein:

the set of color density standard values have been generated by means of a standard densitometer measuring color density of the gamut, the standard densitometer including a plurality of densitometer spectral filter each having a respective standard transmittance characteristic; and the sensor assembly includes at least one filter having a transmittance characteristic that is substantially different from that of any the densitometer filters.

8. A method for calibrated digital color printing comprising the steps of:

providing a known color gamut, an optical sensor assembly, and a printing mechanism;

generating a first set of sensor values by means of the sensor assembly optically sensing colors of the known gamut;

retrieving a set of known color density standard values stored in a memory device, the set of known color density values corresponding to color density of the known gamut generating at least a four by four transformation matrix based upon the first set of sensor values and the known color density standard values, thereby calibrating the sensor assembly;

calibrating the printing mechanism by means of the calibrated optical sensor; and color printing by activating the calibrated printing mechanism to selectively apply colorants onto a printing substrate.

9. The method of claim 8 wherein the step of calibrating the printing mechanism includes:

printing a color print test pattern by means of the printing mechanism selectively applying colorants onto the printing substrate;

generating a second set of sensor values by means of the calibrated sensor assembly optically sensing colors of the test pattern;

generating a set of calibrated color density values of the print test pattern based upon the second set of sensor values and the transformation matrix; and generating a set of image correction translation parameters based upon the set of calibrated color density values of the print test pattern.

10. A method as in claim 8 wherein:

the sensor assembly includes a light source and a plurality of spectral filters; and the step of generating the first set of sensor values by means of the sensor assembly optically sensing colors of the known gamut includes:

illuminating the known color gamut by means of the light source of the sensor assembly; and sensing colors of the illuminated gamut that are transmitted through the plurality of spectral filters of the assembly.

11. A method as in claim 10 wherein:

the set of color density standard values have been generated by means of a standard densitometer measuring color density of the gamut; and optical characteristics of components of the sensor assembly are substantially different from optical characteristics of corresponding components of the densitometer.

12. A method as in claim 11 wherein:

the standard densitometer includes a densitometer light source having a standard spectral energy distribution; and the sensor assembly includes a sensor assembly light source having a spectral energy distribution that is substantially different from that of the densitometer light source.

13. A method as in claim 11 wherein:

the standard densitometer includes densitometer spectral filters having standard transmittance characteristics; and the sensor assembly includes sensor spectral filters having transmittance characteristics that are substantially different from those of the corresponding densitometer filters.

* * * * *